3,779,980
POLY(VINYL CHLORIDE) HOMOPOLYMER
COMPOSITES—FREEZE-DRY TECHNIQUE
FOR PREPARATION
Harmon L. Liebman and Shirley A. Liebman, Lancaster, and Gary W. Paddison, York, Pa., assignors to Armstrong Cork Company, Lancaster, Pa.
Filed Dec. 8, 1971, Ser. No. 205,874
Int. Cl. C08f 47/00
U.S. Cl. 260—34.2
6 Claims

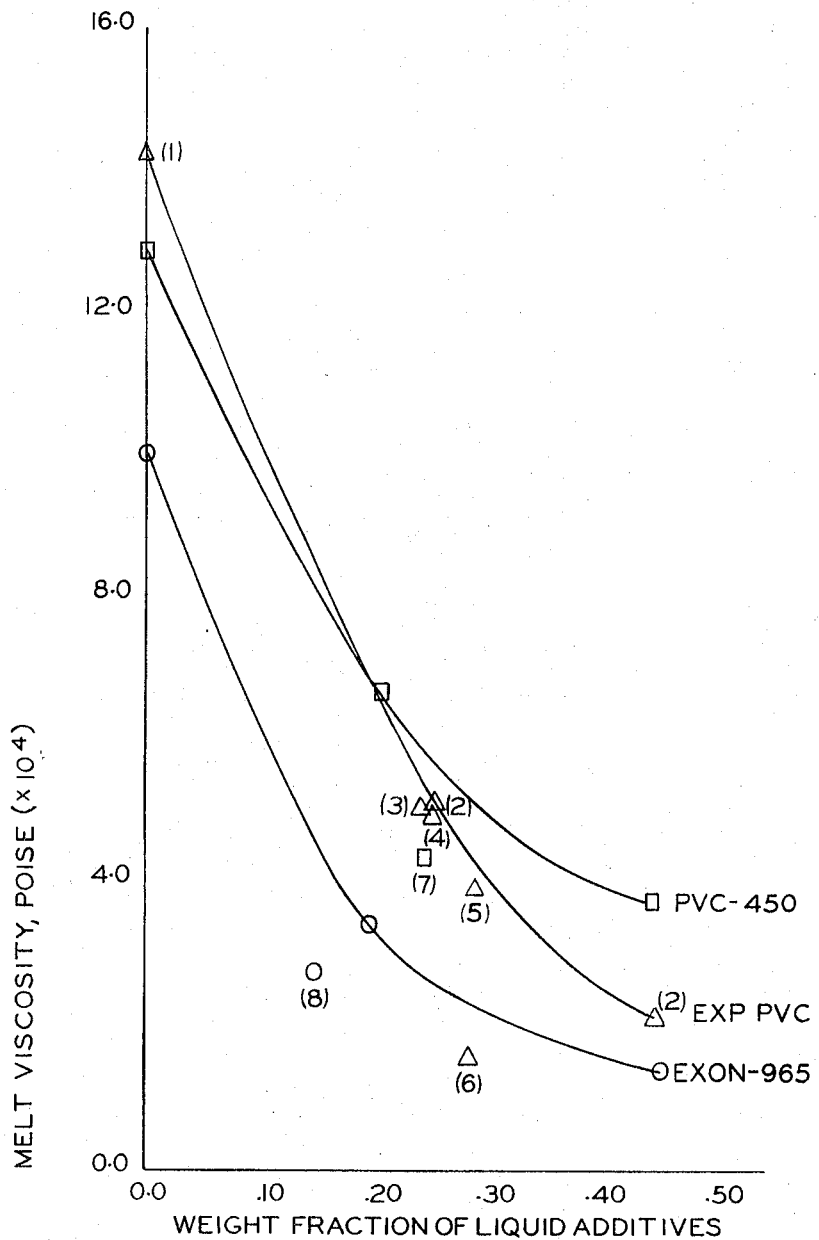
MELT VISCOSITY COMPARISON OF MODES
FOR PVC COMPOSITE PREPARATION
INVENTORS
HARMON L. LIEBMAN
SHIRLEY A. LIEBMAN
GARY W. PADDISON United States Patent Office 3,779,980
Patented Dec. 18, 1973

ABSTRACT OF THE DISCLOSURE

Poly(vinyl chloride) homopolymer composites having improved rheological properties are readily prepared by adding plasticizers and stabilizers to aqueous dispersions of the poly(vinyl chloride) homopolymer particles and freeze-drying the dispersions. Other additives such as finely divided pigments may be incorporated by mixing prior to freeze-drying to produce preblended binder systems. The invention is concerned with homopolymers of poly(vinyl chloride) resin which are prepared by either suspension or bulk polymerization techniques.

DESCRIPTION OF THE PRIOR ART

U.S. Patent No. 2,800,463 discloses freeze-drying a conventional aqueous poly(vinyl acetate) emulsion to obtain the poly(vinyl acetate) in powder form and further discloses spray-drying poly(vinyl acetate) emulsions containing a plasticizer. It is also known that poly(vinyl chloride) particles which are porous, granular and easily processed may be prepared by suspension and bulk polymerization techniques. These resins have more porous particles than those prepared by the emulsion process, and are somewhat analogous to open-cell sponges. Such particles find utilization in dryblending techniques in many industries including, by way of example, their utilization in dryblended binder systems in the resilient flooring industry.

Porous particles of poly(vinyl chloride) homopolymer resins prepared by suspension polymerization or by bulk polymerization are generally available in a wide molecular weight range and in powder form. Suspension polymerization of vinyl chloride is usually carried out as a batch process conducted in a pressure vessel. Air is excluded and an inert atmosphere may be used. Monomers, water, catalysts and suspending agents are charged into the vessel, and polymerization is ordinarily conducted at about 125° to 150° F. to about 70% to 75% conversion. The porous poly(vinyl chloride) particles thus formed are removed by filtration and dried. Such porous particles are readily plasticized by mixing them with the plasticizer together with suitable stabilizers, fillers and pigments as desired, and mixing these under the action of heat to cause the plasticizer to be absorbed into the particles.

SUMMARY OF THE INVENTION

We have found that the porous particles of poly(vinyl chloride) homopolymer resins prepared by bulk and suspension polymerization techniques and which are readily available commercially and porous particles of poly(vinyl chloride) directly as prepared by bulk or suspension polymerization find ready utility in accordance with this invention. In accordance with this invention, the particles of poly(vinyl chloride) homopolymer resins are dispersed in a liquid medium which is a nonsolvent for the polymer and the additive substituents, the dispersed particles mixed with conventional plasticizers, stabilizers, and other additives such as finely divided pigment; the liquid dispersion then frozen, and the liquid sublimed to yield plasticized particles of poly(vinyl chloride) homopolymer in a powder form. All of the steps of the freeze-drying process are carried out at temperatures less than the glass transition temperature of the poly(vinyl chloride) homopolymer resin in order to ensure that no degradation of homopolymer particles occurs. Various freeze-dry techniques may be utilized to form the composite particles.

The freeze-drying technique for preparing poly(vinyl chloride) homopolymer composites results in several advantages including the elimination of a dryblending step in the preparation of binder systems a reduction in the plasticizer/resin ratio while achieving rheological properties equivalent to comparable composites prepared in a conventional fashion having higher plasticizer/resin ratios and the achievement of porous composite particles of poly(vinyl chloride) homopolymer which exhibit improved thermal and ultraviolet stability in products formed therefrom.

BRIEF DESCRIPTION OF THE DRAWING

The drawing sets forth in graph form a melt viscosity comparison for various modes of poly(vinyl chloride) homopolymer composite preparation.

DESCRIPTION OF THE PREFERRED EMBODIMENT

For purposes of evaluating the freeze-dry technique on poly(vinyl chloride) homopolymer composites, a series of various types of poly(vinyl chloride) homopolymers were blended with stabilizers and plasticizers utilizing the following basic formulation:

Ingredient: Weight fraction
Poly(vinyl chloride) homopolymer _____ 0.747
Butyl benzyl phthalate plasticizer _____ 0.224
Argus Chemical Co. Q-275—organo tin stabilizer _____ 0.029

In each of the examples, the poly(vinyl chloride) is dispersed in an aqueous slurry composed of 80% water and 20% solids.

In forming the composites, the additives were introduced to an agitated slurry of the poly(vinyl chloride) homopolymer particles at a rate of 5 milliliters/minute to promote uniform distribution of the additives to the polymer particles with an additional 5 minutes of blending time after complete introduction. At this time, the poly(vinyl chloride) homopolymer particles separated from the water due to the surface absorption of the water and water insoluble additives and, at this point, the solid phase was recovered by suction filtration. Utilizing this method of preparation, composites were prepared with the poly(vinyl chloride) homopolymer slurry being maintained at 25° and 50° C. and with the temperature of the additives being introduced being maintained at 25° C.

A second series of composites as noted in Table I were prepared wherein the additives (25° C.) were introduced to a flowing slurry (25° C.) utilizing a solenoid valve prior to one pass through a 21-element Kenics Corporation "Static Mixer." This mixer produced $2^{21}$ interactions per pass and provided intimate contact between polymer and additive. Again, the solid phase was recovered by suction filtration after one pass.

All preblended mixtures were then incorporated into a suitable diluent at a 50% solids, 50% dilutent composition and frozen into $\frac{1}{8}$" thick slabs by addition of solid carbon dioxide. The time required for freezing was approximately 15 minutes. The slabs were then broken up into particles which were placed on trays.

Freeze-drying was conducted in a 24 square foot Stokes freeze-drier. The freeze-drying with a controlled rate of sublimation of the diluent, where control is affected by PVT (pressure, volume, temperature) dependency of the triple point of the diluent, provides a mode to expand the volume of the included poly(vinyl chloride) homopolymer and advantageously affects the polymer-additive diffusion process without subliming the additives, the triple point being outside of the drying parameters of the freeze-dry cycle. The result was a deeper penetration of the additives to the core of the polymer grains. In each of the examples, the conditions were such that the final product temperature was 90° F. or 10° F. below the glass transition temperature of the composite utilizing a pressure of from 500–200μ Hg. These conditions resulted in a drying cycle of six hours with the final form of the product being a white, granular, free-flowing solid. In each instance, the diluent utilized was water.

The evaluation of the freeze-drying process in the examples that follow is based on the composite properties evidenced by a rheological comparison of melt viscosity. The values obtained for the freeze-dried composites were compared to values obtained utilizing the same formulation but preparing the composites thereform by a conventional dryblending procedure. Polymer particles are introduced into a Henschel blender and mixed at 1,800 r.p.m. until a temperature of 135° F. is attained at which point the liquid additives (room temperature) are slowly added after which the mixing is conducted at 3,400 r.p.m. until a temperature of 210° F. is attained. At this point, mixing is stopped and the dryblend removed from the mixer. Tests on the composites were conducted utilizing a Brabender torque rheometer at test conditions of 135° C.; 40 r.p.m.; 50 cm. volume. The melt viscosity was calculated from the torque data. Since the technique for the introduction of the additives in the preblend mixture of the freeze-dried composites was imperfect, differences in final vinyl plasticizer levels were obtained. All samples were pressed to 100% consolidation and the mass density measured, and from this density value, the percent plasticizing agent was calculated, and the melt viscosity was normalized to account for any differences in final plasticizer level from that of controls. The comparative value is the normalized melt viscosity and the lower value signifies the inventive improvement. Also included are values for a 67 parts per 100 parts resin dryblend using Exon-965 poly(vinyl chloride) homopolymer and a dryblend of the same formulation using a Hooker Rucon B-20 poly(vinyl chloride) homopolymer. The latter polymer is produced by a bulk polymerization technique purported to produce a more porous granule with a molecule weight similar to Exon-965.

The drawing illustrates a comparison of melt viscosity for several modes of poly(vinyl chloride) homopolymer composite preparations. In the study on which the graph is based, three specific poly(vinyl chloride) homopolymer resins were utilized in forming composites utilizing the freeze-dry technique, and the melt viscosities obtained were measured and compared with standard curves for melt viscosities of standard resins at the various plasticizer levels (PVC-450 and Exon-965) and a third curve as set forth was plotted for an experimental poly(vinyl chloride) homopolymer resin at various plasticizer levels. These are identified on the graph by the curve wherein the points are set forth in squares and further identified by PVC-450, the curve wherein the points are identified by circles and further identified by Exon-965, and the curve wherein the reference points are identified by triangles and which is for the experimental poly(vinyl chloride) homopolymer prepared by a standard suspension polymerization technique and having a molecular weight distribution as determined by gel permeation chromatography of $Mn=29,400$, $Mw=73,900$, $Mw/Mn=2.52$ and $Mz/Mn=1.95$.

In this instance, for comparison purposes, the freeze-dried composites were prepared in a slightly different fashion in order to ensure more intimate mixing and more complete absorption of plasticizer by the poly(vinyl chloride) homopolymer particles such that the resultant composites had essentially 100% liquid additive absorption and no normalization of results was necessitated.

As stated above, the melt viscosity reported for the standard resins, the PVC-450 and the Exon-965, are standard curves for melt viscosities determined at various liquid additive amounts. For the experimental poly(vinyl chloride) resin, the point on a curve where there are no liquid additives present was determined by heat drying the homopolymer resin at 100° C. at which point the melt viscosity in poises was determined. The other two points, $\Delta(1)$ and $\Delta(2)$ which established the curve were determined at the indicated weight fraction of liquid additives by adding the freeze-dried poly(vinyl chloride) homopolymer resin to a Henschel blender and mixing at 1,800 r.p.m. until a temperature of approximately 135° F. was obtained, at which time the liquid additives which were at room temperature were slowly added and the mixing was speeded up to 3,400 r.p.m. until a final temperature of 210° F. was obtained, at which point the dryblend was removed and the melt viscosity determined.

For the measurement $\Delta(3)$, the weight fraction of liquid additives indicated was blended in a slurry at room temperature, the slurry consisting of approximately 20%

TABLE 1.—RHEOLOGICAL COMPARISON OF FREEZE-DRYING AS A TECHNIQUE FOR PVC COMPOSITE PREPARATION

| Resin | Conditions for preparation | | Melt viscosity (poise) normalized | Mass density, g./cm.³ | Actual weight, percent plasticizer |
|---|---|---|---|---|---|
| Exon-965 [1] | Polymer only | | 4.23×10⁴ | 1.400 | |
| Do | Dryblend | {60C-polymer / 25C-plasticizer} | 2.61×10⁴ | 1.335 | 13.9 |
| Do | F.D. | {25C-polymer / 25C-plasticizer} | 1.92 | 1.350 | 10.6 |
| Do | Dryblend-67 phr | | 1.17 | 1.207 | 44.9 |
| Exon-965 [2] | Dryblend | {60C-polymer / 25C-plasticizer} | 2.72 | 1.320 | 28.2 |
| Do. [2] | F.D. | {50C-polymer / 25C-plasticizer} | 0.59 | 1.312 | 31.2 |
| Rucon B-20 | Dryblend | {60C-polymer / 25C-plasticizer} | 2.64 | 1.250 | 33.9 |
| PVC-450 [1] | Polymer only | | 5.57 | 1.400 | |
| PVC-450 | Dryblend | {60C-polymer / 25C-plasticizer} | 5.27 | 1.331 | 14.7 |
| PVC-450 | F.D. | {25C-polymer / 25C-plasticizer} | 3.26 | 1.318 | 18.0 |
| Suspension PVC [1,3] | Polyper only | | 6.90 | 1.400 | |
| Do | Static mixer, non F.D. | {25C-polymer / 25C-plasticizer} | 3.81 | 1.320 | 17.9 |
| Do | Static mixer, F.D. | {25C-polymer / 25C-plasticizer} | 3.00 | 1.305 | 20.9 |
| Do | F.D. | {50C-polymer / 25C-plasticizer} | 1.12 | 1.307 | 20.0 |

[1] Rheological test conditions for polymer only were 200° C., 40 r.p.m. 50 cm.³
[2] Same formulation except that solid stabilizer Nuostabe V-1398 (50% melamine, 12½% ZnO, 25% pentaerythritol and 12½% Ba-Ca laurate) was substituted for Q-275 liquid stabilizer.
[3] Molecular weight distribution—Mn=29,400, Mw=73,900, Mw/Mn=2.52, Mz/Mn=1.95.

by weight of polymer particles and, after mixing, the slurry, with the weight of polymer particles adjusted to 50%, was frozen into a slab which was broken into particles which were heat dried at 100° C. at standard pressure. The melt viscosity for the composite was then determined.

Essentially, the same procedure was utilized for the measurement recorded at Δ(4), except that, after drying at 100° C. at standard pressure, vacuum was applied at 600μ Hg for 15 minutes. The melt viscosity was then measured.

For the measurement recorded at Δ(5), an initial aqueous suspension of poly(vinyl chloride) homopolymer particles was formed having a 20% by weight solids. This suspension was agitated, and the aqueous suspension was heated to approximately 25° C. The liquid plasticizer and stabilizer were heated to approximately 200° C. and added to the agitated slurry at a rate of 20 milliliters per minute per pound polymer. The slurry with the liquid additives added was agitated while heating to 10° C. above the glass transition temperature of the polymer (70°–75° C.) and held under agitation at this temperature for 15 minutes, after which the solids were filtered. The filtered composite was then incorporated into an aqueous slurry at 50% solids and frozen into a ⅛" thick slab by addition of solid carbon dioxide, and the slab thus formed was broken into particles which were placed on trays and freeze-dried as hereinbefore described.

For the measurements recorded at Δ(6), □(7) and ○(8), the above-described blending and freeze-dry cycles were utilized except that the aqueous suspension was initially heated to 10° C. below the glass transition temperature of the polymer phase before the liquid plasticizer and stabilizer, which were heated to about 200° C., were added.

In each instance, melt viscosity measurements were made on the resultant freeze-dry composite, and for all melt viscosity measurements, a Brabender torque rheometer was utilized using test conditions of 135° C.; 40 r.p.m.; 50 cm. volume. The melt viscosities were calculated from the torque data.

We claim:

1. A process for forming plasticized particles of suspension or bulk polymerized polyvinyl chloride homopolymer resin comprising:
    (A) dispersing the polyvinyl chloride homopolymer particles in a liquid which is a non-solvent for the polymer and plasticizer,
    (B) intimately mixing plasticizer into the dispersion, thus causing absorption of the plasticizer by the polyvinyl chloride homopolymer particles, and
    (C) freeze-drying the plasticized particles by freezing the dispersion and subliming the liquid while maintaining the plasticized particles at a temperature less than the glass transition temperature of the polyvinyl chloride homopolymer resin.

2. The process of claim 1 wherein the particles of resin are particles of suspension polymerized polyvinyl homopolymer resin and wherein the liquid dispersion medium is water.

3. The process of claim 1 wherein the dispersion initially formed is heated to just below the glass transition temperature of the polymer phase and wherein the plasticizer added is heated to an elevated temperature which is below its boiling point, the addition of plasticizer during mixing being done at a relatively slow rate after which the dispersion of polyvinyl chloride homopolymer resin and plasticizer is agitated at a temperature just above the glass transition temperature of the polyvinyl chloride homopolymer.

4. The process of claim 2 wherein the dispersion initially formed is heated to just below the glass transition temperature of the polymer phase and wherein the plasticizer added is heated to an elevated temperature which is below its boiling point, the addition of plasticizer during mixing being done at a relatively slow rate after which the dispersion of polyvinyl chloride homopolymer resin and plasticizer is agitated at a temperature just above the glass transition temperature of the polyvinyl chloride homopolymer.

5. A process for converting preformed particles of suspension or bulk polymerized polyvinyl chloride homopolymer resin to plasticized and stabilized polyvinyl chloride homopolymer particles comprising:
    (A) initially dispersing the polyvinyl chloride homopolymer preformed particles in a liquid which is a non-solvent for both the polyvinyl chloride homopolymer particles and for the plasticizer and stabilizer,
    (B) intimately mixing plasticizer and stabilizer into the liquid dispersion to cause the plasticizer and stabilizer to be absorbed by the polyvinyl chloride homopolymer particles, and
    (C) freeze-drying the particles of plasticized and stabilized polyvinyl chloride homopolymer resin by freezing the dispersion, and subliming the liquid non-solvent while maintaining the plasticized and stabilized particles at a temperature less than the glass transition temperature of the polyvinyl chloride homopolymer resin, thus forming a free-flowing mass of particles of stabilized and plasticized polyvinyl chloride homopolymer resin.

6. The process in accordance with claim 5 wherein the particles of resin are suspension polymerized polyvinyl chloride homopolymer resin and wherein the liquid non-solvent is water.

References Cited
UNITED STATES PATENTS

| | | | |
|---|---|---|---|
| 3,651,008 | 3/1972 | Moser et al. | 260—37 R |
| 2,800,463 | 7/1957 | Morrison | 260—34.2 |
| 2,373,347 | 4/1945 | Schoenfeld | 260—34.2 |

ALLAN LIEBERMAN, Primary Examiner

J. H. DERRINGTON, Assistant Examiner

U.S. Cl. X.R.

260—31.8 R, 45.75 R, 45.75 K

Disclaimer

3,779,980.—*Harmon L. Liebman* and *Shirley A. Liebman*, Lancaster, and *Gary W. Paddison*, York, Pa. POLY(VINYL CHLORIDE) HOMOPOLYMER COMPOSITES—FREEZE-DRY TECHNIQUE FOR PREPARATION. Patent dated Dec. 18, 1973. Disclaimer filed Dec. 19, 1973, by the assignee, *Armstrong Cork Company*.

Hereby enters this disclaimer to claims 1 to 6 of said patent.

[*Official Gazette February 5, 1974*]